United States Patent [19]

Nakazato et al.

[11] Patent Number: 4,696,463
[45] Date of Patent: Sep. 29, 1987

[54] AUTOMATIC ORIGINAL SHEET FEEDING APPARATUS

[75] Inventors: Yukitaka Nakazato; Kenji Hashimoto, both of Tokyo; Takashi Taruki, Yokohama, all of Japan

[73] Assignee: Ricoh Company, Ltd., Tokyo, Japan

[21] Appl. No.: 842,492

[22] Filed: Mar. 21, 1986

[30] Foreign Application Priority Data

Mar. 27, 1985 [JP] Japan .............................. 60-43247[U]

[51] Int. Cl.⁴ .......................................... B65H 29/68
[52] U.S. Cl. ................................... 271/176; 271/182; 271/209
[58] Field of Search ............... 271/270, 202, 203, 125, 271/258, 259, 265, 110, 3.1, 186, 209, 182, 176

[56] References Cited

U.S. PATENT DOCUMENTS

| 3,719,267 | 3/1973 | Reist | 271/202 X |
| 4,264,067 | 4/1981 | Adams | 271/186 X |
| 4,361,319 | 11/1982 | Ikeda | 271/209 |
| 4,579,327 | 4/1986 | Furuichi | 271/3.1 |

Primary Examiner—Richard A. Schacher
Attorney, Agent, or Firm—Cooper, Dunham, Griffin & Moran

[57] ABSTRACT

An automatic original sheet feeding apparatus for carrying original sheets mounted on an original sheet mounting table to a predetermined work position and then through an ejection roller to an original sheet receiver, successively, is disclosed, in which the ejection roller is braked while ejecting the original sheet to thereby eject said original sheet onto a region in the vicinity of the ejection roller without substantial inertia.

4 Claims, 11 Drawing Figures

AUTOMATIC ORIGINAL SHEET FEEDING APPARATUS

FIELD OF THE INVENTION

The present invention relates to an automtic original sheet feeding apparatus for use in an apparatus such as a copying apparatus, a facsimile apparatus or the like in which a copying operation of an original sheet or an image reading operation etc., is performed.

RELATED ART STATEMENT

Figure 1:
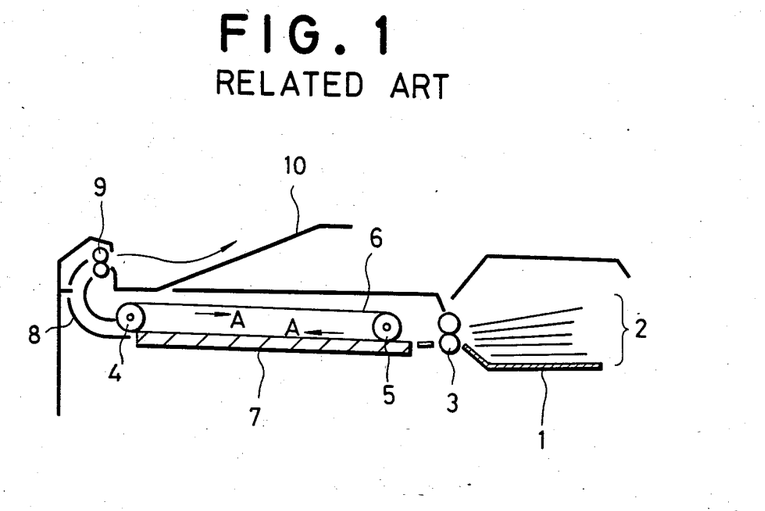
FIGS. 1 and 2 show examples of the conventional original sheet feeding apparatus, respectively.

FIG. 1 shows a conventional automatic feeding apparatus, schematically, which is a related art for the present invention. In the apparatus shown in FIG. 1, a single or plural original sheets 2 mounted on an original sheet mounting table 1 are fed one by one by means of a pair of rollers 3 to a conveyor belt 6 provided between rollers 4 and 5 and running in a direction A and then moved by the latter to a predetermined operation position on a contact glass plate 7 at which they are illuminated with exposure light when the apparatus is used in a copying apparatus. When the apparatus is used in a facsimile apparatus, a readout operation of the original sheet is performed at the predetermined position in the known manner. The conveyor belt 6 is kept stationary during such operation is performed.

After such operation completes, the conveyor belt 6 is restarted to discharge or eject the original sheet on the contract glass plate 7 through a conveying path 8 and sheet ejecting rollers 9 onto a stacker 10 which is slanted steeply as shown in FIG. 1 to receive the original sheets ejected at high speed successively and stack them.

A provision of such stacker is disadvantageous in not only cost but also weight. Furthermore, since the stacker must be steeply slanted, it is impossible to make the height of the automatic original sheet feeding apparatus small as a whole.

Figure 2:
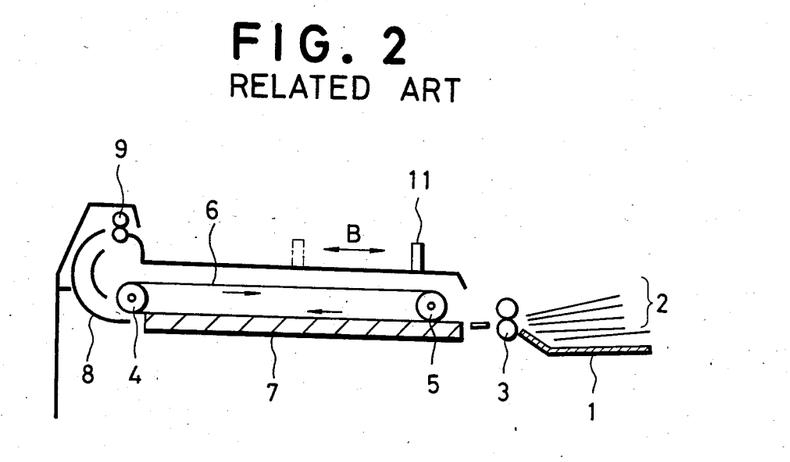

FIG. 2 shows another conventional apparatus which is provided with a stopper 11 which is movable in directions B. The stopper 11 functions to block the original sheet ejected from the rollers 9 at high speed to thereby obtain a well registered stack of the original sheets. However, since it is necessary to provide a driving means for driving the stopper, causing the cost and the weight of the apparatus to increase. Furthermore, due to the necessity of an opening for allowing a movement of the stopper 11, there are problems of safety and appearance of the apparatus.

SUMMARY OF THE INVENTION

In view of the state of the art, an object of the present invention is to provide an automatic original sheet feeding apparatus which is inexpensive and light in weight and which can stack original sheets discharged successively in a well registered manner.

The above object can be achieved according to the present invention by providing, in an automatic original sheet feeding apparatus in which an original sheet to be copied which is mounted on an original sheet mounting table is transferred to a predetermined position, e.g., an illumination position in a copying machine for exposure and then ejected through an ejection roller to an original sheet receiver, an original sheet detecting means disposed in a path of the original sheet for detecting the original sheet, a braking means for restricting the rotation of the ejection roller and a control means responsive to an output information from the detecting means for actuating the braking means such that the rotation of the ejection roller is braked gradually while the original sheet is being ejected so that the original sheet is ejected without substantial inertia.

DETAILED DESCRIPTION OF PREFERRED EMBODIMENTS

Figure 3:
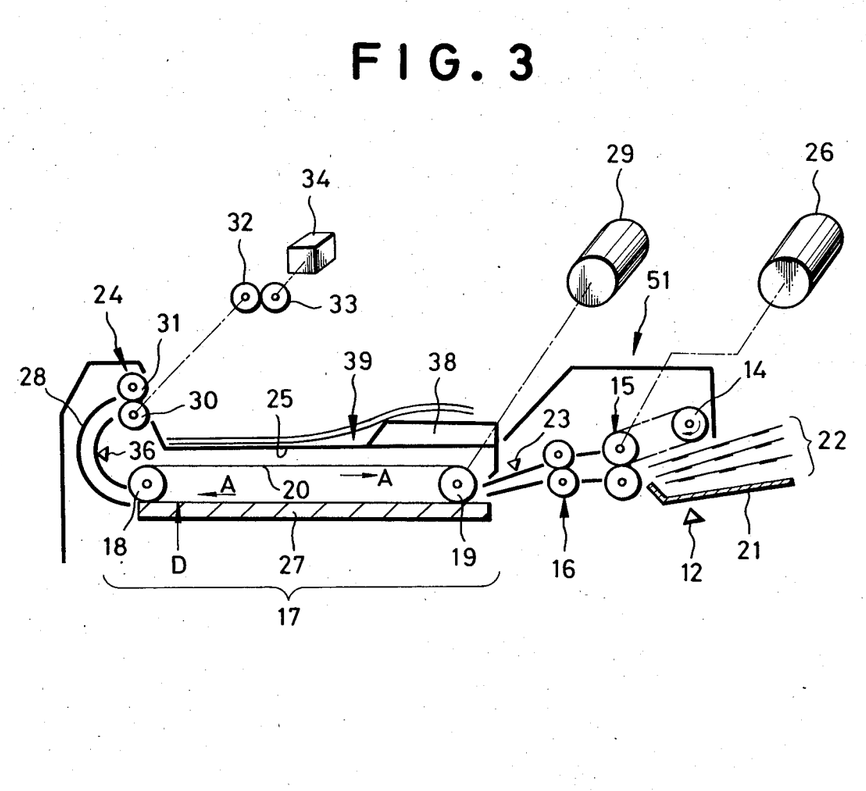
FIG. 3 is a cross sectional side view of an automatic original sheet feeding apparatus according to the present invention.

In an embodiment shown in FIG. 3, original sheets 22 are stacked on an original sheet holder 21 with image sides thereof being down and with the younger the page number being the lower.

Figure 4:
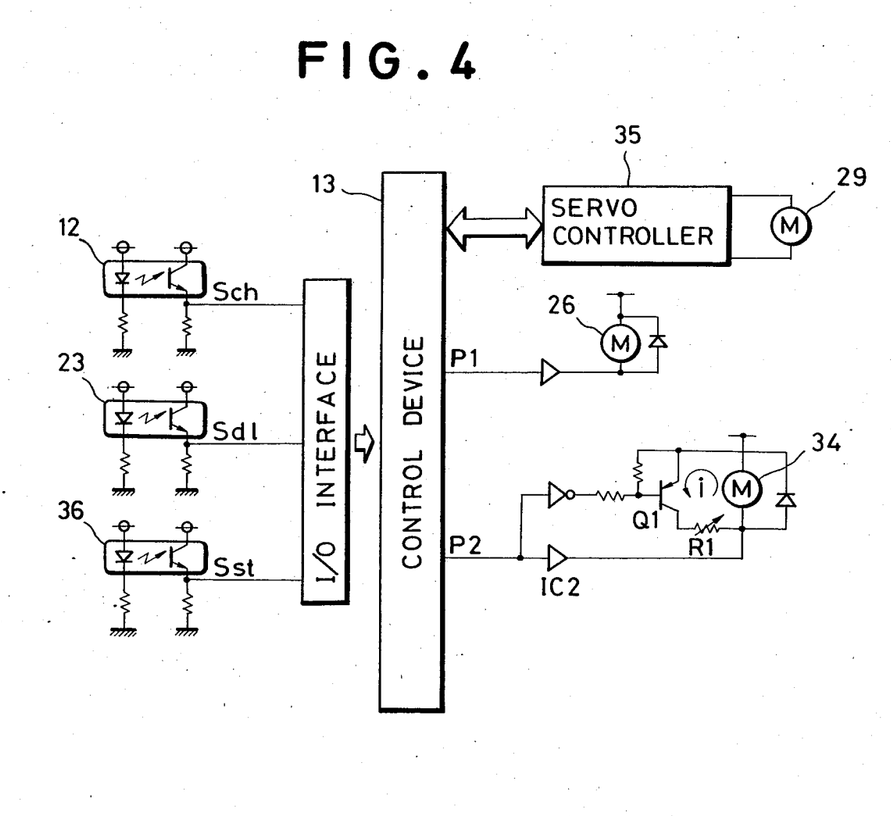
FIG. 4 is a block circuit diagram of a control circuit for use in the apparatus shown in FIG. 3.

A set sensor 12 is disposed beneath the original sheet holder 21. The set sensor 12 functions to detect whether or not the original sheets 22 are set on the holder 21 and, when it is confirmed that there are the original sheets 22 set in the holder 21, provides a confirmation signal Sch which is supplied to a control device 13 provided in a CPU as shown in FIG. 4.

When an operation start button which is not shown is depressed to instruct the control device 13 a commencement of the operation such as copying operation, a pick-up roller 14 is lowered by a suitable means (not shown) and, at the same time, a paper feed motor 26 is actuated to rotate the pick-up roller 14 clockwisely. Several upper sheets of the original sheet 22 stacked are fed forwardly (leftwardly in FIG. 3) by the rotating pick-up roller 14 and the uppermost one of the several sheets is separated frictionally therefrom by a separating roller pair 15 and then fed to a pull-out roller pair 16. The original sheet is then fed to an original sheet conveying portion 17 by the pull-out roller pair 16.

A conveyor belt 20 provided between rollers 18 and 19 disposed in the original sheet conveyor portion 17 moves or rotates in synchronism with the pull-out roller pair 16. A driving force for the conveyor belt 20 is given by a conveyor motor 29 coupled to the roller 19. The operation of the motor 29 is controlled by an instruction supplied by the control device 13 via a servo controller 35. The conveyor belt 20 can be arbitrarily stopped and restarted by the servo controller 35 and the speed of the belt 20 is constant. A length and a front edge of the original sheet are detected by a register sensor 23 disposed in a downstream side of the pull-out roller 16, while being fed to the conveyor belt 20.

A portion including the pick-up roller 14, the pull-out rollers 15, the separating rollers 16 and the register sensor 23 constitutes an original sheet feeding portion 51 for supplying one of the original sheets to the original sheet conveying portion 17 and will be described in more detail later.

The length and front edge information Sdl from the register sensor 23 is supplied to the control device 13 shown in FIG. 4. When the front edge of the original sheet arrives at a reference position D on a contact glass plate 27, the conveyor motor 29 and hence the conveyor belt 20 is stopped by an instruction from the control device in FIG. 4 and thus the original sheet is stopped at the position which is the predetermined operation position.

A predetermined operation such as illumination for exposure in the case of the copying machine is performed at the latter position.

After the predetermined operation is completed, the conveyor belt 20 is restarted to move the original sheet leftwardly. The original sheet passes through a path 28 and then ejected onto a cover 25 acting as an original sheet receiver, by an ejection roller 24. The latter roller is composed of a lower driving roller 30 and an upper driven roller 31. The driving roller 30 is driven through gears 32 and 33 by an ejection motor 34.

Since, when the driving roller 30 rotates at a constant speed, the original sheet may be jumped-out from the ejection roller 24, the original sheets may be stacked disorderly. In order to remove this problem, an ejected sheet sensor 36 is disposed in the path 28.

When the sensor 36 detects a rear edge of the original sheet which is being conveyed, it provides a detection signal Sst which is supplied to the control device 13. Upon the signal Sst, the control device 13 provides a logically high signal "H" at its terminal P2. The output high signal "H" at the terminal P2 causes the ejection motor 34 to be deenergized. Even after the deenergization, the motor 34 and hence the driving roller 30 tend to continue their rotations by inertia.

At this time, however, a transistor Q1 connected in parallel to the motor 34 is turned on and a current (i) which acts to brake the motor 34 flows as shown by an arrow. As a result, the motor 34 is braked and thus the rotational speed of the driving roller 30 is reduced gradually. Therefore, the ejecting force applied to the original sheet at a time when the rear edge thereof passes the ejection roller 24 is not so large that there is no case of the jumping-out of the original sheet from the ejection roller 24, resulting in a soft landing of the original sheet and thus a well registered stack of the ejected original sheets.

An amount of the current (i) can be set arbitrarily by adjusting a value of a variable resistor R1 inserted into a path of the current (i). When the value of the resistor R1 is small, the current (i) becomes large, resulting in a large braking force. It is usual to set the variable resistor R1 such that, at a time when the original sheet is departed from the ejection roller 24, the driving roller 30 is stopped. With this setting of the value of the variable resistor R1 the original sheet ejected may be dropped softly in the vicinity of the ejection roller 24, resulting in a well registered stack of the original sheets.

When the sensor 36 does not detect the rear edge of the original sheet, the control device 13 provides a logical low signal "L" at its terminal P2 upon which the motor 34 rotates at a predetermined constant speed.

Figure 5:
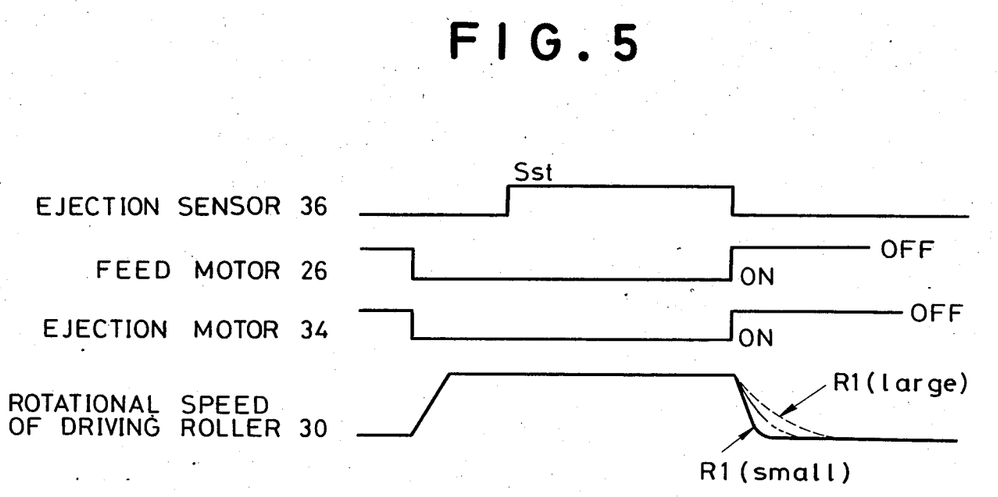
FIG. 5 is a timing chart showing an operation of the apparatus in FIG. 3.

FIG. 5 is a timing chart of the operations of the motors 26, 34 and 36 with a variation of rotational speed of the driving roller 30 due to a variation of value of the resistor R1. As is clear from FIG. 5, when the value of the resistor R1 is small, the braking effect is considerable and the speed of the driving roller reduces considerably. On the other hand, when the value of the resistor R1 is large, the reducing rate of the speed is small.

According to this embodiment, the rotation of the ejection roller 24 is controlled, by a brake means including the transistor Q1 and the variable resistor R1, so that a well registered stack of the ejected original sheets is obtainable. Therefore, there is no need of providing an especial means, such as the stacker 10 (FIG. 1) or the stopper 11 (FIG. 2), on the cover 25 for receiving the ejected original sheets, causing the apparatus to be inexpensive and light weight. Due to the absence of the stacker, the height of the apparatus can be minimized. As a result, the overall appearance of the apparatus can be improved remarkably. In order to make a removal of the stacked original sheets easy, it may be advisable to form a small protrusion 38 in an upper surface of the cover 25 with a distance between the protrusion 38 and the ejection roller being shorter than the length of the original sheet. With such protrusion, there is a small space 39 provided between the stacked sheets and the cover 25. Therefore, the stacked sheets can be easily picked up by inserting a finger into the space.

The brake means is not limited to that including the transistor Q1 and the variable resistor R1. For example, it may take in the form of a mechanical brake device by which the rotation of the ejection roller 24 is regulated frictionally.

Figure 6:
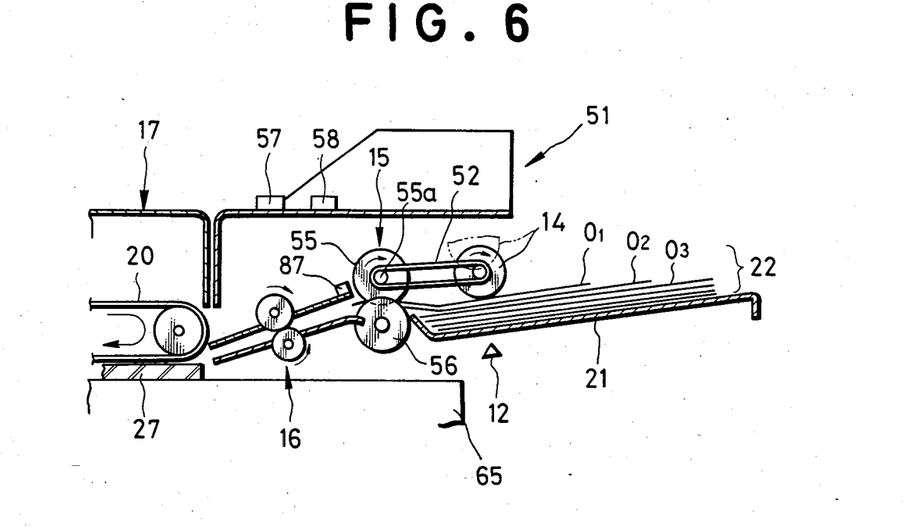
FIG. 6 is a cross sectional side view of an original sheet feeding portion of the apparatus in FIG. 3.

FIG. 6 shows the original sheet feeding portion 51 in more detail. In FIG. 6, the separating roller pair 15 is composed of a feed roller 55 and a separating roller 56. The feed roller 55 is driven clockwisely by the original sheet feeding motor 26 (FIG. 3). The pick-up roller 14 is also driven clockwisely by a belt 52.

The belt 52 together with the pick-up roller 14 is swingable around a shaft 55a of the feed roller 55 and, when the roller 14 is in a position shown by an imaginary line, the roller 14 is separated from the uppermost original sheet and, when it is in the shown position, it contacts with it.

When a plurality of original sheets $O_1$, $O_2$, $O_3$ etc. on the original sheet mounting table 21 with image sides thereof down and a print button (not shown) is depressed, the pick up roller 14 is lowered to the position shown by a solid line to contact with a rear side of the uppermost original sheet $O_1$ and the roller 14 starts to rotate clockwisely. Due to a friction between the sheet $O_1$ and the rotating roller 14, the sheet $O_1$ is moved into between the feed roller 55 and the separating roller 56 which are provided in the vicinity of a front (left) end of the original sheet mounting table 21.

The original sheet $O_1$ sent toward the rollers 55 and 56 passes through them and the pull-out roller pair 16 to a space between the conveyor belt 20 of the original sheet conveying portion 17 and the contact glass plate 27 of a copying machine 65. A second original sheet $O_2$ is then picked up and sent to the space and so on. The operation in which a plurality of original sheets are fed successively is referred to in this specification as auto-document feed (ADF) mode and that in which a single original sheet is set on the table and is fed by depressing the print button is referred to as semiautomatic document feed (SADF) mode.

A selection of mode between ADF and SADF may be preformed by depressing either an ADF mode setting button 57 or an SADF mode setting button 58 shown in FIG. 6.

Figure 8:
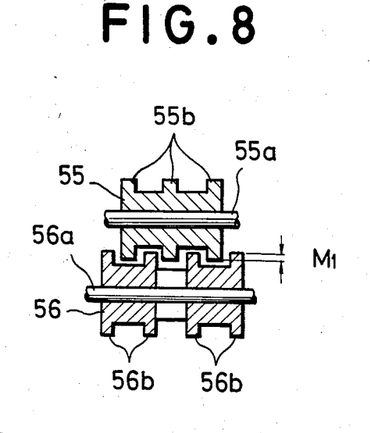
FIG. 8 is a view along an arrow VIII in FIG. 7.

In FIG. 8, the feed roller 55 is formed in opposite end portions and in a center portion thereof with increased diameter portions 55b, respectively, and the separating roller 56 is formed with four increased diameter portions 56b. The increased diameter portions 55b of the feed roller 55 and the increased diameter portions 56b of the separating roller 56 are interleaved mutually as shown, with an overlapping $M_1$. With such arrangement of the rollers 55 and 56 as shown in which the rollers are not in direct contact with each other, it is possible to avoid a damage of an image on the original sheet due to abrasion by the rollers.

Figure 7:
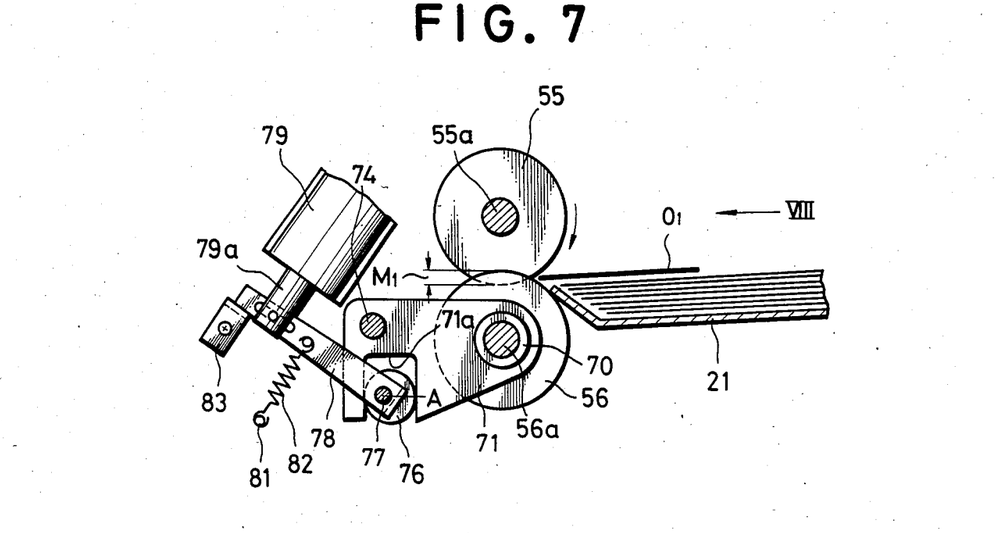
FIG. 7 is a cross sectional side view of a portion of the apparatus, including a separating roller and a feed roller, in a state where a considerable amount of overlapping is set.
Figure 11:
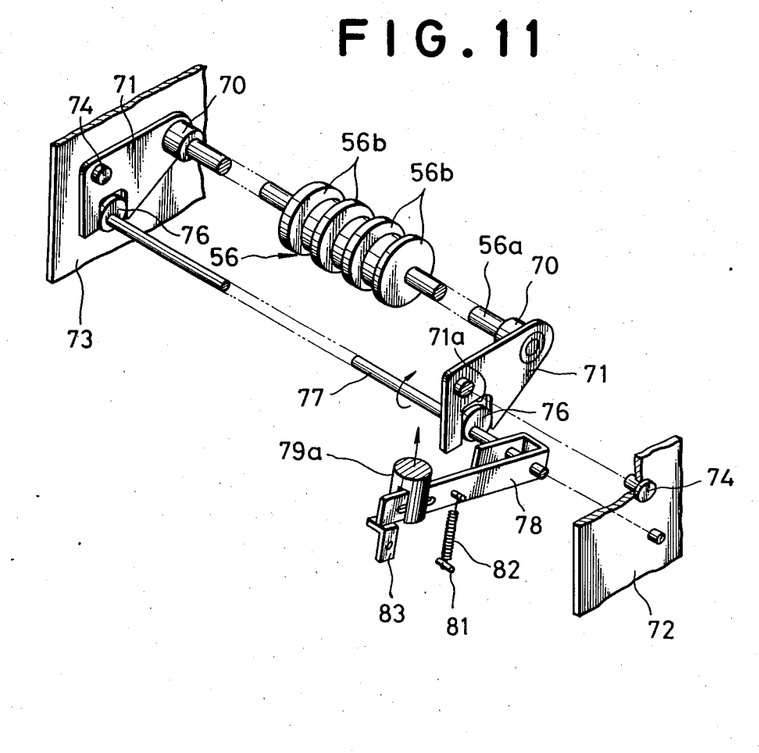
FIG. 11 is a perspective view of a mechanism for regulating the overlapping.

In FIGS. 7 and 11, a shaft 56a fixedly mounting the separating roller 56 is supported at opposite ends thereof by regulating plates 71 through one-way clutches 70, respectively. The one-way clutch 70 functions to allow a clockwise rotation of the separating roller 56 while preventing a counterclockwise rotation thereof. That is, the separating roller 56 can not rotate in a direction corresponding to the moving direction of the original sheet fed from the original sheet mounting table 21 and, therefore, when original sheets overlapped are sent, only the uppermost original sheet is forwarded by the feed roller 55, leaving the other sheet as they are.

The regulation plates 71 are swingably supported by pins 74 fixed to frame plates 72 and 73, respectively. Each regulation plate 71 is formed with a notch 71a in which a cam 76 for regulating an amount of the overlapping is disposed. The cam 76 is fixedly supported by a stay rod 77 having opposite ends supported rotatably by the frame plates 72 and 73, respectively.

An end of an actuation lever 78 is fixedly secured to the stay rod 77 and the other end of the lever 78 is coupled to a plunger 79a of a solenoid 79.

A spring 82 is provided between the actuation lever 78 and a fixed pin 81 to bias the lever 78 clockwisely. The clockwise rotation of the lever 78 due to the spring 82 is restricted by a stopper member 83.

In FIGS. 7 and 8, when the regulation cam 76 rotates, the regulation plate 71 swings around the shaft 74 in directions along which the separating roller 56 moves with respect to the feed roller 55. When the regulation cam 76 is in a position shown by a letter A, the amount of overlapping of the rollers 55 and 56 is set as $M_1$.

The overlapping amount M1 is enough to separate the original sheets from each other when the sheets are sent in an overlapped state by the pick-up roller 14 (FIG. 6) and is preferrably around 0.6 mm to 0.8 mm, for example.

Assuming a case where a plurality of original sheets having images written by a pencil in center areas thereof are to be copied, the ADF mode setting button 56 (FIG. 6) is depressed firstly. Then, after the original sheets are set on the original sheet table 21, the print button is depressed to feed the sheets one by one starting from the uppermost sheet, by means of the pick-up roller 14.

When overtapped some of the sheets are sent at one time, only the uppermost sheet $O_1$ is separated from the others by means of the rotating feed roller 55 and the stationary separating roller 56. When the front edge of the uppermost sheet arrives at a sheet sensor 87, the latter provides a detection signal by which the solenoid 79 in FIG. 7 is actuated.

Figure 9:
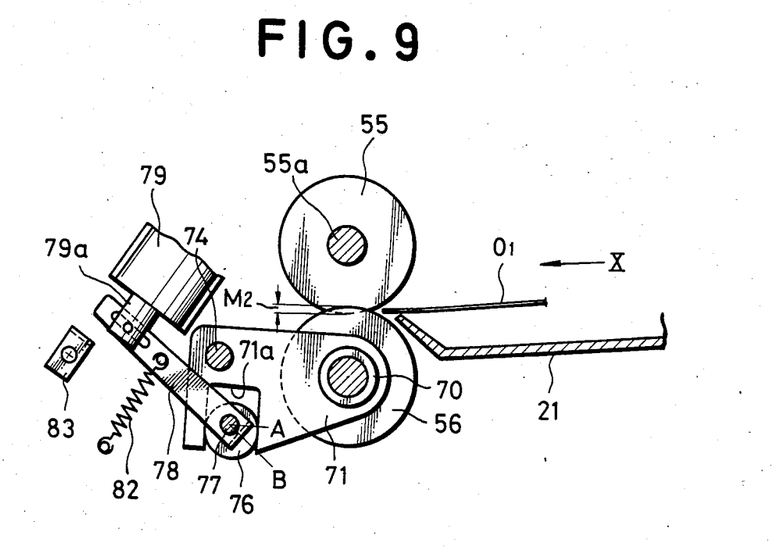
FIG. 9 is a cross sectional side view of the portion in FIG. 7 in a state where a small amount of overlapping is set.
Figure 10:
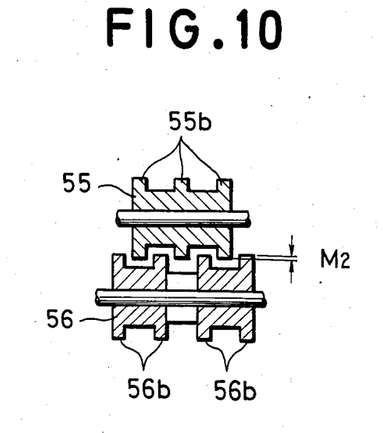
FIG. 10 is a view taken along an arrow X in FIG. 9.

With the solenoid 79 actuated, the plunger 79a is retracted to rotate the actuation lever 78 clockwisely against the spring 82 up to a position shown in FIG. 9. With this rotation of the lever 78, the regulation cam 76 is rotated from the first position A to a second position B. In the position B, the overlapping amount of the rollers 55 and 56 is set as $M_2$ (FIG. 10).

The overlapping amount $M_2$ is enough to carry the original sheet without providing the separation effect. The amount $M_2$ is smaller than the amount $M_1$ and usually set in a range from about 0.1 mm to 0.2 mm.

The original sheet $O_1$ separated from other sheets by the rollers 55 and 56 with the overtapping of $M_1$ and then fed by rotational friction of the roller 55 having the overlapping of $M_2$ with respect to the roller 56, and when the sheet passes through the sensor 87, the solenoid 79 is deenergized.

As mentioned, since the sheet after separated is sent with the overlapping of $M_2$, it is possible to minimize a mutual abrasion of the image plane of the original sheet and the separating roller 56 to thereby minimize a possibility of degradation of the image by carbon powder.

When the solenoid 79 is deenergized, the actuation lever 78 in FIG. 9 rotates counterclockwisely to the position shown in FIG. 7 by the action of the spring 82, by which the regulation cam 76 is returned from the position B to the position A so that the regulation plates 71 rotate counterclockwisely about the pins 74 to set the overlapping to $M_1$.

This operation is repeated upon every occurence of the overlapping of the original sheets.

In a case where the front edge portion of the original sheet has an image written with, for example, a pencil carbon powder of which may degrade the image, the SADF mode setting button 58 in FIG. 6 is depressed to select the SADF mode in which each original sheet is fed after it is set.

Upon the depression of the button 58, the solenoid 79 is energized. That is, when the SADF mode is selected, the solenoid is always energized contrary to the ADF mode.

Upon the energization of the solenoid 79, the regulation cam 76 rotates from the first position A to the second position B in FIG. 9 to set the overlapping of $M_2$.

Under the conditions, when an original sheet is set on the table 21 and the print button is depressed, the sheet is sent to the rollers 55 and 56 the overlapping of which is $M_2$. That is, in this case, there is no need of separating the sheet from other sheet since only one sheet is set. Since an area over which the abrasion force of the sheet with respect to the separating roller 56 is reduced covers the whole area of the sheet, it is possible to prevent a degradation of the image due to carbon powder throughout the original sheet.

In this case, even if the original sheet has images written by a ball-point-pen or typed out, the degradation of the images due to abrasion can be prevented in the same way. Particularly, in the case of the images written by the ball-point-pen which is not dried completely, the degradation of the images subjected to a copying operation may be severe. According to the present invention, such degradation is also prevented effectively.

Although, in the embodiment, the regulation cam for regulating the amount of overlapping comprises the rotary cam it may be possible to use a cam having a linearly slanted cam surface which is in direct contact with an upper peripheral surface of the shaft 56a shown in FIG. 7. In this case, the amount of overlapping can be regulated by linearly shifting the cam to move the separating roller 56 vertically.

What is claimed is:

1. An automatic original sheet feeding apparatus for carrying original sheets mounted on an original sheet mounting table to a predetermined work position and ejecting them in succession by an ejecting roller from said predetermined work position to an original sheet receiver such that the ejected sheets are approximately horizontal on said receiver comprising:

an original sheet detecting means disposed in an original sheet carrying passage between said work position and said ejecting roller for detecting said original sheets;
 a brake means capable of applying a braking force to said ejecting roller to gradually reduce the rotation speed of said ejecting roller;
 a control means responsive to an output information from said original sheet detecting means for actuating said brake means; and
 wherein after an original sheet has been engaged by said ejecting roller, said ejecting roller is braked gradually to finally be stopped by said brake means, while said original sheet is being ejected thereby, to thereby eject said original sheets onto a region in the vicinity of said ejection roller without substantial inertia.

2. The automatic original sheet feeding apparatus as claimed in claim 1, further comprising an ejection motor for driving said ejection roller, and wherein said brake means includes a transistor connected in parallel to said ejection motor, said transistor being turned on when said ejection motor is deenergized to supply a current to said ejection motor, said current acting to brake said ejection motor.

3. The automatic original sheet feeding apparatus as claimed in claim 2, wherein a variable resistor is inserted into a current path through which said current flows.

4. The automatic original sheet feeding apparatus as claimed in claim 1, wherein said original sheet receiver comprises a cover member for covering an original sheet carrying portion of said apparatus, said cover being provided, on a region thereof remote from said ejection roller, with a protruded portion, a distance between said ejection roller and said protruded portion being shorter than a length of said original sheet.

* * * * *